United States Patent

Flammini

[11] Patent Number: 4,616,409
[45] Date of Patent: Oct. 14, 1986

[54] NON-CONTACT TYPE RING SETTER AND SENSOR FOR USE THEREWITH

[76] Inventor: John T. Flammini, 1335 W. Morgan St., Rialto, Calif. 92376

[21] Appl. No.: 750,521

[22] Filed: Jun. 27, 1985

[51] Int. Cl.⁴ .................................... B23Q 15/00
[52] U.S. Cl. .................................. 29/705; 29/267; 29/282; 29/407; 29/720; 29/721
[58] Field of Search ............... 29/407, 705, 706, 707, 29/708, 720, 721, 244, 267, 282; 33/169 B; 73/861, 861.39, 272 R, 700

[56] References Cited

U.S. PATENT DOCUMENTS

| | | | |
|---|---|---|---|
| 2,904,955 | 9/1959 | Kreiter | 29/267 X |
| 3,813,756 | 6/1974 | Rigsby et al. | 29/267 X |
| 3,864,971 | 2/1975 | Tanney | 73/861.39 |
| 3,875,797 | 4/1975 | Zweng | 73/861.39 |
| 4,502,212 | 3/1985 | Meek | 29/721 |

OTHER PUBLICATIONS

Unichem Industries, Inc.; brochure; (Jan. 1985); p. 3.
Pneumatic Control Accessories, NC-66A, a C. A. Norgren Co. brochure, (Apr. 1983); pp. 2-3.

*Primary Examiner*—Mark Rosenbaum
*Assistant Examiner*—R. S. Wallace
*Attorney, Agent, or Firm*—Sheldon & Mak

[57] ABSTRACT

A non-contact type ring setter uses a pressurized gas operated sensor comprising two nozzles, each having an elongated opening for passing the pressurized gas. The openings are spaced apart and opposite to each other. A drill bit is moved relative to a collar, with the line of travel of the drill bit passing through the space between the two openings. Each of the elongated openings has a longitudinal axis substantially parallel to the direction of travel of the drill bit. When the collar and the drill bit are moved relative to each other a predetermined amount, the gas pressure detected by the sensor changes.

19 Claims, 7 Drawing Figures

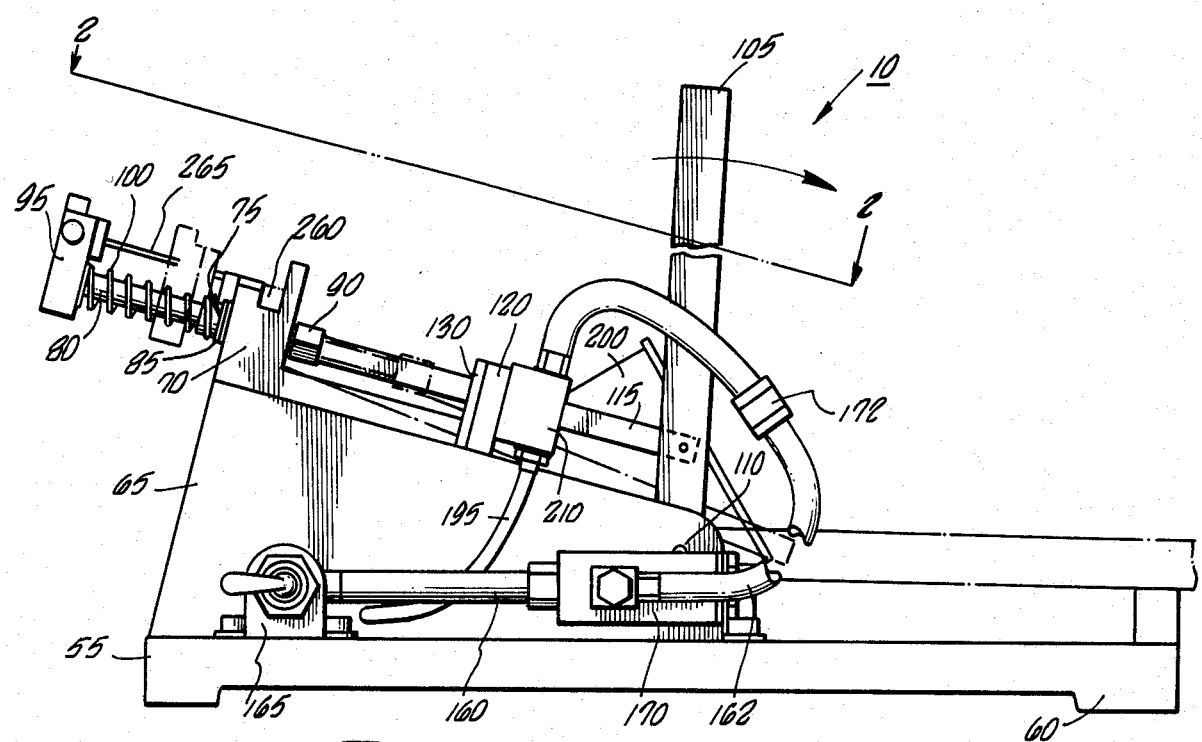
FIG_1
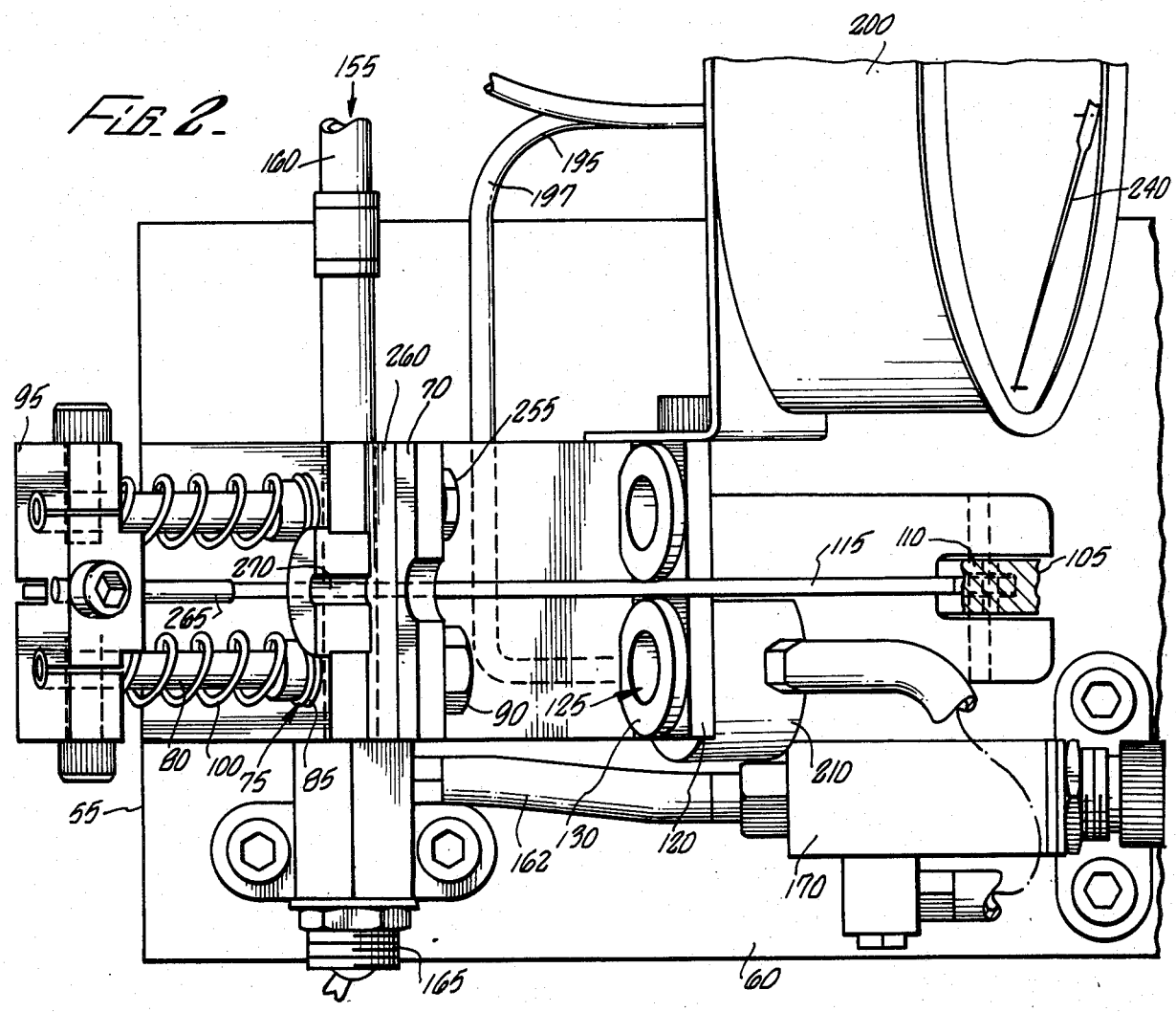
FIG_2

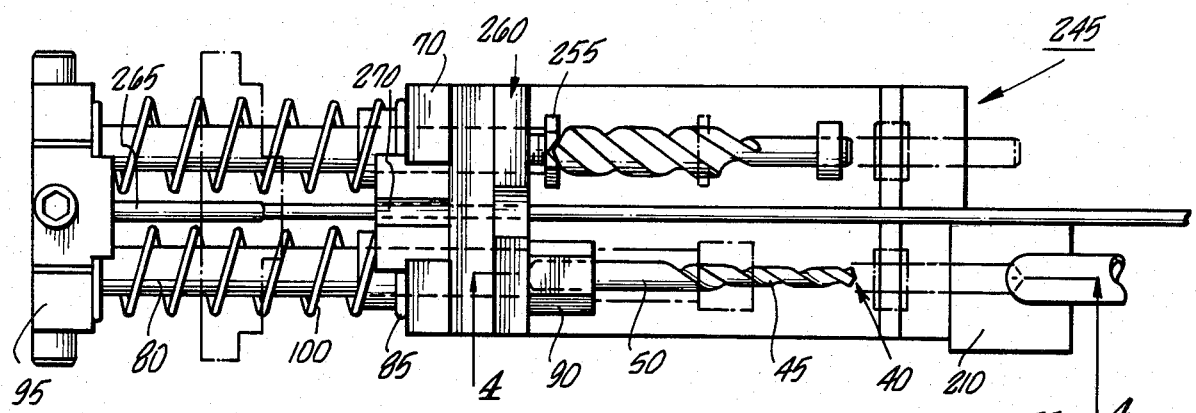
FIG_3.
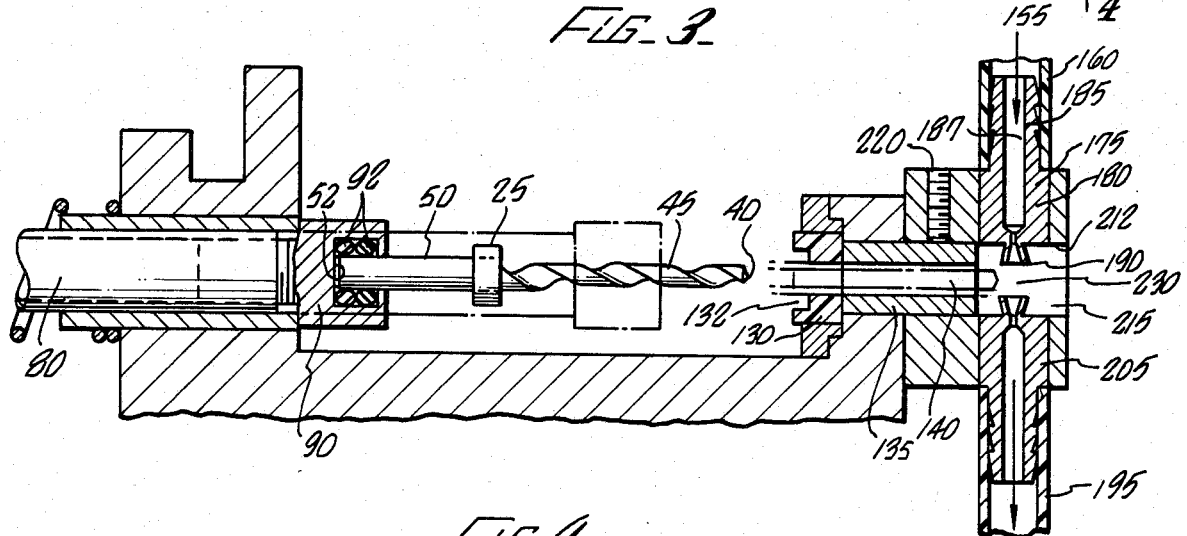
FIG_4.
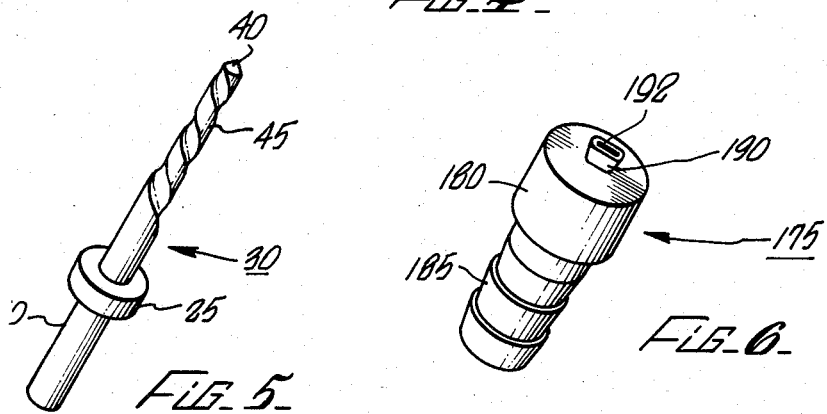
FIG_5.
FIG_6.
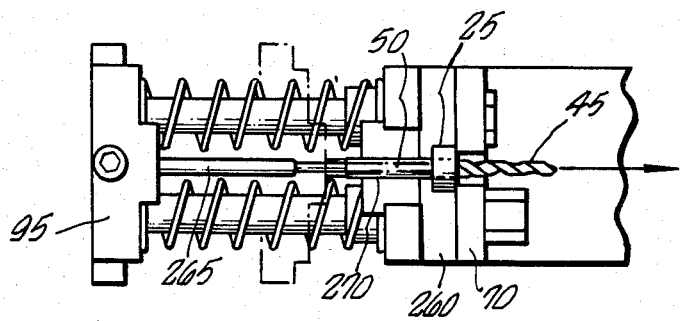
FIG_7.

NON-CONTACT TYPE RING SETTER AND SENSOR FOR USE THEREWITH

BACKGROUND

This invention relates to a device for setting an annular collar on a drill bit so that it is at a predetermined distance from the tip of the drill bit.

Numerically controlled drilling machines are becoming an indispensable fixture in many production shops. For example, they are used to produce circuit boards for electronic equipment. The operation of these drilling machines generally requires compressed air. When the drilling machine is in use, a tray of drill bits travels beneath the drill spindle as directed by computer program instructions, until the correct drill bit is directly beneath the collet of the drill spindle. The collet opens, picks up the selected drill bit, and moves the bit over to a work piece for drilling. Alternatively, the spindle could travel over a stationary tray of drill bits, or both the spindle and the tray can move relative to each other.

For circuit board production, generally the work piece, which is a Fiberglas TM plaque to be used as the substrate for the board, is placed on a sheet of backing material generally between about 62 mil to about 125 mil in thickness. The backing material in turn lies flat on an aluminum tooling plate, which is suspended on an air table. It is important that the tip of the drill bit drills down to an accurate depth. The drill bit must not pass through the backing layer and damage the tooling plate. Likewise, a drill hole which is too shallow is unacceptable. A plastic collar is generally placed on the shank of the drill bit at a predetermined distance from the tip of the drill bit. The collar butts against the collet to assure an accurate drill depth.

Drill bits for numerically controlled drilling machines can be factory pre-collared. However, pre-collared bits can be expensive. Moreover, for certain applications the collars have to be set at various distances from the tip of the drill bit during an extended run. It is therefore general practice that the drill bits and collars are purchased separately, with the collars being set on the drill bit by production shop personnel.

Manually operated "Ring Setters" for collaring and decollaring drill bits are popular with most production shops. These devices have a cylindrically shaped barrel. The annular collar, which has an outer diameter larger than the inner diameter of the barrel, is held against one end of the barrel. A drill bit is pushed through the collar and partly into the barrel, where the tip of the drill bit pushes against the contact tip of a mechanical dial indicator. The dial indicator indicates when the collar is set at the correct distance from the tip of the drill bit.

An acceptable accuracy for setting the collar is ±5 mils, which the ring setter described above is capable of achieving. However, the existing ring setter suffers from a very serious shortcoming. The end of the drill bit is pushed against the contact tip of the dial indicator. This can chip or otherwise damage the tip of the drill bit, especially with smaller diameter drill bits. The chipping problem is especially serious for drill bits with hardened flutes, e.g., those with flutes formed of a carbide material. Carbide is hard, but it chips easily. It has been estimated that the damage rate can be as high as 20% for carbide drill bits smaller than ⅛ inch in diameter. Replacing or resharpening these damaged drill bits can be expensive and time consuming.

Therefore there is a need for a device for setting a collar on a small diameter drill bit without damaging the drill bit.

SUMMARY

The ring setter device of the present invention satisfies this need. The device is for placing an annular collar on a drill bit, the drill bit having a tip, a body and a shank. The device places the collar on the shank at a predetermined distance from the tip. The ring setter device comprises means for causing relative movement between the advance of the tip of the drill. The sensor comprises a pressurized gas source, and a gas pressure detector spaced apart and opposite the gas source. The gas source and detector are located so that when the collar and the drill bit are moved relative to each other a predetermined distance, the gas pressure detected by the detector changes.

Preferably the gas source and the detector each comprises a nozzle for passing a pressurized gas. Each nozzle has a tip ending in an opening. The two openings are spaced apart and opposite to each other; the space between the two openings being in the line of travel of the drill bit.

Preferably the sensor also comprises a housing having an internal wall surface facing a cavity. The tip of each of the two nozzles protrudes beyond the internal wall surface of the housing into the cavity.

In one version the opening in each nozzle is elongated and has a longitudinal axis. The two openings are oriented so that the two longitudinal axes are parallel to each other.

DRAWINGS

These and other features, aspects, and advantages of the present invention will become better understood with reference to the following description, appended claims, and accompanying drawings where:

FIG. 1 is a side view of a ring setter according to the present invention;

FIG. 2 is a top perspective view of the ring setter of FIG. 1 taken on line 2—2 of FIG. 2;

FIG. 3 is a perspective view of the ring setting mechanism of the ring setter of FIG. 1;

FIG. 4 is a cross-sectional view of the ring setting mechanism shown in FIG. 3 taken along line 4—4 in FIG. 3;

FIG. 5 is a perspective view of a drill bit with the collar set on the shank;

FIG. 6 is a front perspective view of a nozzle suitable for use with the non-contact type ring setter of the present invention; and FIG. 7 is a perspective view of the decollaring mechanism suitable for use with the ring setter of the present invention.

DESCRIPTION

Referring to FIG. 1, a non-contact type ring setter 10 comprises means for causing relative movement between an annular collar 25 and a drill bit 30, and a non-contact type sensor. Referring to FIG. 5, the drill bit 30 has a tip 40, a body 45, and a shank 50 having an end 52. The sensor is capable of detecting the advance of the tip of the drill bit. The drill bit 30 preferably has a standardized shank diameter, e.g., ⅛ inch nominal diameter (0.1245 inch actual diameter).

In a preferred version of the present invention, referring to FIGS. 1 and 2, the movement causing means comprises a cast metal base 55 having a substantially planar bottom portion 60 and a raised portion 65. On the raised portion 65 there is a guide 70, having at least one guide hole 75 therethrough. A plunger 80 is slidably received in the guide hole 75. Preferably there is a bushing 85 lining the guide hole 75 to facilitate the sliding of the plunger 80. One end 81 of the plunger 80 is affixed to a holder 90, capable of holding the drill bit 30 by the end 52 of the shank 50, such that the drill bit 30 is in line with the plunger 80. Preferably the holder 90 has neoprene O-rings 92 therein, as shown in FIG. 4, so that holder 90 is capable of releasably holding on to the drill bit 30. The holder 90 can be replaced with holders of other dimensions so as to accommodate drill bit shanks of various diameters. The holder 90 is larger than the guide hole 75 and therefore cannot go through the guide hole 75.

The other end 93 of the plunger 80 is affixed to a guide plate 95. The guide plate 95 is located opposite the holder 90, with the guide 70 between them. The guide plate 95 is also larger than the guide hole 75 such that the guide plate cannot pass through the guide hole 75. There is biasing means 100, which preferably is a helical compression spring. The biasing means in its normal state holds the guide plate 95 spaced apart from the guide 70, such that the holder 90 butts against the guide 70.

A lever 105 is pivotally attached at one end to the base 55 at a lever hinge 110. A link rod 115 is attached pivotally at one end to the guide plate 95 and at the other end pivotally to the lever 105. As shown in FIG. 1, when the lever 105 is pulled downward, the link rod 115 pulls on the guide plate 95 and compresses the biasing means 100, so that the plunger 80 slides along the guide hole 75 such that the holder 90 becomes spaced apart from the guide 70. When the lever 105 is released, the biasing means 100 returns to its normal state.

Spaced apart from the guide 70, and on the raised portion 65, is a protruding stop 120. The stop 120 is on the same side of the guide as is the holder 90. The stop 120 has an opening 125 therethrough. Affixed to the stop 120 on the side facing the guide 70 is a plate 130. The plate 130, on the side facing the holder 90, has a recess 132 which is sized to receive the collar 25. A guide bushing 135 is affixed at one end to the plate 130, and extends beyond the stop 120 through the opening 125. The plate 130 and the guide bushing 135 have a bushing passage 140. The passage 140 has a longitudinal axis which is in the line of travel of the plunger 80. The bushing passage 140 has a diameter smaller than the outside diameter of the collar 25, but slightly larger than the diameter of the shank 50 of the drill bit 30. For example, the bushing passage 140 can have a diameter of about 125 mils for use with a shank with a nominal diameter of $\frac{1}{8}$ inch (0.1245 inch actual diameter).

The non-contact sensor which forms part of this invention is pressurized gas operated. The preferred gas is compressed air, which preferably has a substantially constant pressure. The sensor is capable of detecting the advance of the tip 40 of the drill bit 30. The sensor comprises a pressurized gas source, and a gas pressure detector.

As shown in FIGS. 1 and 2, the pressurized gas source comprises an inlet gas passage 160, which in turn comprises inlet tubings 162, an on/off switch 165, a needle valve 170 for adjusting the pressure and flow rate of a pressurized gas 155, and a gas filter 172 preferably down stream of the needle valve 170.

The pressurized gas source also comprises a gas inlet nozzle 175 attached to the downstream end of the gas inlet passage 160. The inlet nozzle 175 comprises a nozzle body 180, a nozzle stem 185 on one side of the nozzle body, and a nozzle tip 190 on the other side of the nozzle body and extending beyond the nozzle body 180. The nozzle tip 190 ends in a nozzle opening 192. Preferably the nozzle opening 192 is elongated, has a longitudinal axis, and is from about 2 to about 10 mils in width, and from about 50 to about 100 mils in length. An internal passage 187 passes through both the nozzle stem 185 and the nozzle body 180, for passing the pressurized gas 155 through the nozzle tip 190 and the nozzle opening 192. The internal passage of the inlet nozzle preferably is from about 70 to about 100 mils in diameter. Preferably the nozzle stem 185 has a barbed outside configuration for easy attachment to the tubing 162 of the gas inlet passage 160.

As shown in FIGS. 1 and 2, the gas pressure detector comprises a gas outlet passage 195 which has outlet tubings 197, and a gas pressure meter 200. The gas pressure detector also comprises a detector nozzle 205. The detector nozzle 205 is similar in structure to the inlet nozzle 175, except that the internal passage of the detector nozzle 205 is from about 30 to about 50 mils in diameter. The detector nozzle 205 is attached to the upstream end of the gas outlet passage 195.

The sensor preferably also comprises a sensor housing 210, which has an internal wall surface 212 facing a cavity 215. The cavity 215 is capable of slidingly receiving the guide bushing 135. As shown in FIG. 4, a set screw 220 is threaded through the wall of the housing 210, for affixing the housing 210 relative to the outside surface of the guide bushing 135.

The inlet nozzle 175 and the detector nozzle are both affixed to the housing 210. Each nozzle extends through the wall of the housing 210, with the tip of each of the two nozzles protruding beyond the internal wall surface into the cavity, and with the two nozzle openings being spaced apart and being opposite to each other. The two nozzle openings are in gaseious communication with each other. Preferably each of the two tips extends beyond the internal wall surface 212 by a distance of at least about 30 mils. A detection space 230, which is the space between the two nozzle tips, is in the line of travel of the plunger 80. For the version in which each of the two nozzles has an elongated nozzle opening, it is preferable that the longitudinal axes of the two nozzle openings be substantially parallel to each other. If the device 10 is to be operated manually, it is preferable that the longitudinal axes of the openings be substantially parallel to the line of travel of the plunger 80.

It is preferably that the two nozzle openings are disposed symmetrically about the line of travel of the plunger 80. It is also preferable that the guide bushing 135 and the housing 210 be so disposed that, when the housing 210 is adjusted relative to the guide bushing 135, the distance between each of the two nozzle openings and the line of travel of the plunger 80 does not vary.

It is preferable that the size of the detection space 230 be as small as possible, while allowing the drill bit 30 to pass unobstructed through the detection space 230. For example, for drills having a nominal diameter of $\frac{1}{8}$ inch and less, the two nozzle openings are preferably spaced apart by no more than about 130 mils. The body of a small drill bit (less than $\frac{1}{8}$ inch) is usually about 0.5 mil smaller in size than the nominal diameter. For a $\frac{1}{8}$ inch drill there is therefore a clearance of about 2.75 mils on each side.

To use the ring setter 10, the collar 25 is slipped onto the shank 50 close to the body 45. The end 52 of the shank 50 is then placed into the holder 90 so that the drill bit 30 is in line with the plunger 80. When the lever 105 is pulled, the biasing means 100 is compressed. The holder 90 and the drill bit 30 are advanced so that the tip 40 of the drill bit passes through the passage 140 of the guide bushing 135. The shank 50 is closely guided by the guide bushing 135 so that the drill 30 travels in line with the plunger 80. The collar 25 butts against and is stopped by the plate 130, with the collar 25 fitting inside the recess 132. As the drill bit 30 is pushed forward by the downward movement of the lever, the drill bit 30 and the collar 25 move relative to each other.

The pressurized gas 155 flows through the gas inlet passage 160 and the nozzle opening 192 of the inlet nozzle 175, across the detection space 230, into the detector nozzle 205 through its nozzle opening, then through the gas outlet passage 195 to the meter 200. The meter 200 measures the residual pressure in the gas 155. When the tip 40 of the drill bit 30 moves into the detection space 230, it interferes with the gas flow across the detection space 230, thereby causing a drop in the reading of the meter 200.

Calibration may be required to keep the relevant readings within the range of the meter 200. A base line and a set line are marked on the scale of the meter. With the compressed gas 155 flowing, the needle valve 170 is adjusted until the needle 240 of the meter 200 overlaps the base line. A drill bit with a collar already set at the desired distance from the tip of the drill is also required. The tip of the drill bit is placed through the passage 140, with the collar butting the plate 125. The set screw 220 is loosened, and the position of the housing 210 is adjusted relative to the guide bushing 135 until the needle 240 of the meter 200 overlaps the set line. The set screw 220 is then tightened, and the sensor is calibrated. It is usually not necessary to recalibrate frequently, as most numerically controlled drilling machines use drill bits with a standardized distances between the collar and the tip of the drill bit, e.g., 800 mils.

It was found that the narrow width of the nozzle openings imparts high sensitivity to the non-contact sensor. An accuracy of about ±2 mils is achievable with the pressurized gas 155 having a pressure of about 3 psig. The version of the device 10 described above is manually operated. Human operators usually need substantial reaction time to stop pulling down on the lever 105. Thus the pressure drop caused by the intrusion of the tip 40 of the drill bit 30 into the detection space 230 should not be too abrupt. The elongated nozzle openings, when lined up parallel to the line of travel of the drill bit, gives a gradual drop in pressure readings upon intrusion of the tip of the drill bit into the detection space. Therefore a long reaction time is available.

It is important that the nozzle openings be as close together as permissible, while allowing free passage of the body of the drill. The close proximity of the nozzle openings to the drill bit tip means that more of the gas passed out from the inlet nozzle is deflected by the drill bit, and this accounts for a high sensitivity for the sensor.

The housing 210 protects the detector nozzle 205 from external eddies that may interfere with the pressure readings. However, the housing 210 also creates another problem. Some of the gas which passed through the inlet nozzle gets deflected off the internal wall surface 212, and creates undesirable turbulence. The turbulence is most marked along the internal wall surface 212. To avoid the distracting effect of this turbulence on the pressure reading, at least the detector nozzle 205 should protrude beyond the internal wall surface 212 of the housing 210, preferably by a distance of at least about 30 mils.

The ring setter of this invention is adaptable for use with drill bit of all sizes. However, accuracy achievable is limited by the size of the detection space 230. The larger it is, the lower the accuracy. Because tip chipping is not really a serious problem with the larger size drill bits, a preferred version of the present invention is designed for use with drill bits of up to $\frac{1}{8}$ inch in nominal diameter. The detection space 230 is preferably set at no more than about $\frac{1}{4}$ inch in size between the nozzle openings of the inlet nozzle and the detector nozzle. The detection space 230 is more preferably about 130 mils in size. The two nozzle openings are preferably disposed symmetrically about the detection space 230.

An advantage of the non-contact type ring setter of the present invention is that it is operated with pressurized gas. Most numerically controlled drilling machines are powered by compressed air. Therefore there are usually extra compressed air mains on hand near these drilling machines. For example, the ring setter can tap compressed air from an 85 psig air line, and step down the pressure to about 2.5 psig using the needle valve 170.

Another advantage of the non-contact ring setter of this invention is its simplicity. There are few moving parts, and all the components are easily replaceable. Maintenance is easy. There are no complicated electronics to contend with. Using the ring setter requires minimal training. Many of the components, for example, tubings for the gas passages, switches, valves, gas pressure meters, etc., are stock items usually kept on hand in production shops with numerically controlled drilling machines. The cost of the non-contact ring setter of the present invention is competitive with prior art contact type ring setters, yet the problem with damaged drill bit tips has been eliminated.

To set the collar on a large size drill bit (larger than $\frac{1}{8}$ inch nominal diameter), a contact type ring setting mechanism is used. As shown in FIGS. 2 and 3, the contact type ring setting mechanism 245 is similar in structure to that of the non-contact ring setter described above, with the exception that the holder 90 is replaced by a disc 255, and that there is no need for the non-contact sensor described above.

The disc 255 is threadingly attached to the end of the plunger. The disc 35 has a cone shaped depression in its center on the surface facing away from the guide, so that when the tip of a drill bit is pressed against the disc 35, the tip does not contact the disc 35. This reduces the chance of chipping. In use, the collar 25 is slipped onto the shank near the end 52 of the shank. The shank is inserted through the passage in the guide bushing so that the tip 40 faces the disc 35. The lever 105 is pulled downward. The disc 35 presses against the drill bit 30 at the tip 40, while the collar 25 is retained by the plate. The drill bit 35 therefore moves relative to the collar 25. The contact type ring setter is calibrated using a drill bit having a collar already set at the desired distance from the tip. The disc's position is adjusted by screwing it in or out of the plunger as required, such that when the lever 105 is pulled all the way down, the collar 25 is set at the desired distance from the tip 40 of the drill bit 30.

Preferably there is also a decollaring mechanism comprising a notch 260 on top of the guide 70, capable of receiving the collar on a drill bit. There is a pin 265 which is affixed to the guide plate 95, the pin 265 being disposed with its longitudinal axis being substantially parallel to the line of travel of the plunger 80. There is a depression 270 on the guide 70, the depression 270 being capable of receiving the shank 50 of the drill bit 30, and the depression 270 having a longitudinal axis in line with that of the pin 265. In use, as shown in FIG. 7, the drill bit with the collar is placed with the shank 50 resting in depression 270, and with the collar 25 resting in notch 260. When the lever 105 is pulled downward, the pin 265 pushes against the end 52 of the shank, while the collar is held against the guide 70. The drill bit 30 can thus be pushed through the collar 25 and be removed.

Although the present invention has been described in considerable detail with regard to certain versions thereof, other versions are possible. For example, in an automatic version of the device 10, the pressure drop measured by the sensor causes the movement causing means to stop advancing the tip of the drill bit into the detection space of the sensor. Since machines do not need long reaction times, the nozzle openings need not be elongated. The openings should be small to ensure a high sensitivity for the sensor, e.g. from 2 to about 8 mils in diameter. Therefore, the spirit and scope of the appended claims should not be limited to the description of the preferred versions contained herein.

What is claimed is:

1. In a device for placing an annular collar on a drill bit, the drill bit having a tip, a body, and a shank, the device being used for placing the collar on the shank at a predetermined distance from the tip, the device comprising means for causing relative movement between the collar and the drill bit so that the collar is mounted on the drill bit shank, the improvement comprising:
   a pressurized gas operated, non-contact sensor for detecting the advance of the tip of the drill, the sensor comprising:
   (a) a pressurized gas source; and
   (b) a gas pressure detector spaced apart and opposite the gas source;
   the gas source and detector being located so that when the collar and the drill bit are moved relative to each other a predetermined amount, the gas pressure detected by the detector changes.

2. The device of claim 1 in which:
   (a) the pressurized gas source comprises an inlet nozzle for passing a pressurized gas, the inlet nozzle having a tip ending in an elongated opening having a longitudinal axis; and
   (b) a gas pressure detector comprising a detector nozzle for passing a pressurized gas, the detector nozzle having a tip ending in an elongated opening having a longitudinal axis;
   the two openings being spaced apart and opposite to each other such that the longitudinal axes of the two openings are each substantially parallel to the direction of travel of the drill bit, the space between the two openings being in the line of travel of the drill bit.

3. The device of claim 2 in which the drill bit has a nominal diameter of no more than about ⅛ inch, and in which the two openings are spaced apart by a distance of from about 130 mils to about 250 mils.

4. The device of claim 3 in which each of the two openings is from about 2 to about 10 mils in width, and from about 25 to about 100 mils in length.

5. The device of claim 4 wherein each of the nozzles further comprises an internal passage for passing a pressurized gas, with the internal passage of the inlet nozzle being from about 70 to about 100 mils in diameter; and with the internal passage of the detector nozzle being from about 30 to about 50 mils in diameter.

6. The device of claim 1 in which:
   (a) the pressurized gas source comprises an inlet nozzle for passing a pressurized gas, the inlet nozzle having a tip ending in an opening; and
   (b) a gas pressure detector comprising a detector nozzle for passing a pressurized gas, the detector nozzle having a tip ending in an opening;
   and in which the sensor further comprises a housing comprising an internal wall surface and a cavity, the wall surface facing the cavity;
   wherein the tip of the detector nozzle protrudes beyond the internal wall surface into the cavity, with the two openings being spaced apart and opposite to each other, the two openings being in gaseous communication, the space between the two openings being in the line of travel of the drill bit.

7. The device of claim 6 wherein the tip of the detector nozzle protrudes beyond the internal wall surface by a distance of at least about 30 mils.

8. The device of claim 6 wherein the tip of the inlet nozzle also protrudes beyond the internal wall surface into the cavity.

9. The device of claim 6 wherein the two openings are spaced apart by a distance of from about 130 to about 250 mils.

10. The device of claim 6, further comprising a guide bushing on which the housing is slidably received, both the guide bushing and the housing being in the line of travel of the drill bit, the housing capable of being moved relative to the guide bushing while the distances between each of the two openings and the line of travel of the drill bit remain constant.

11. The device of claim 6 wherein each of the two nozzles further comprises an internal passage for passing a pressurized gas, with the internal passage of the inlet nozzle being from about 70 to about 100 mils in diameter; and with the internal passage of the detector nozzle being from about 30 to about 50 mils in diameter.

12. A pressurized gas operated, non-contact sensor suitable for use in a device for placing an annular collar on a drill bit having a nominal diameter of no more than about ⅛ inch, the drill bit having a tip, a body and a shank, the device being used for placing a collor on the shank at a predetermined distance from the tip, the sensor being capable of detecting the advance of the tip of the drill, the sensor comprising:
   (a) a pressurized gas source comprising an inlet nozzle for passing a pressurized gas, the inlet nozzle having a tip ending in an elongated opening having a longitudinal axis; and
   (b) a gas pressure detector comprising a detector nozzle for passing a pressurized gas, the detector nozzle having a tip ending in an elongated opening having a longitudinal axis;
   the two openings being spaced apart by a distance of from about 130 mils to about 250 mils, and being opposite to each other such that the longitudinal axes of the two openings are substantially parallel to each other.

13. The sensor of claim 12 wherein each of the two openings is from about 2 to about 10 mils in width, and from about 25 to about 100 mils in length.

14. The sensor of claim 12 wherein each of the two nozzles further comprises an internal passage for passing a pressurized gas, with the internal passage of the inlet nozzle being from about 70 to about 100 mils in diameter; and with the internal passage of the detector nozzle being from about 30 to about 50 mils in diameter.

15. A pressurized gas operated, non-contact sensor suitable for use in a device for placing an annular collar on a drill bit, the drill bit having a tip, a body and a shank, the device being used for placing a collar on the shank at a predetermined distance from the tip, the sensor being capable of detecting the advance of the tip of the drill, the sensor comprising:
(a) a pressurized gas source comprising an inlet nozzle for passing a pressurized gas, the inlet nozzle having a tip ending in an opening;
(b) a gas pressure detector comprising a detector nozzle for passing a pressurized gas, the detector nozzle having a tip ending in an elongated opening; and
(c) a housing comprising an internal wall surface and a cavity, the wall surface facing the cavity;
wherein the tip of the detector nozzle protrudes beyond the wall surface by a distance of at least about 30 mils into the cavity, with the two openings being spaced apart and opposite to each other, and being in gaseous communication.

16. The sensor of claim 15 wherein the tip of the inlet nozzle also protrudes beyond the internal wall surface into the cavity.

17. The sensor of claim 15 wherein each tip protrudes beyond the internal wall surface by a distance of at least about 30 mils.

18. The sensor of claim 17 suitable for use in a device for placing the collar on a drill bit having a nominal diameter of no more than about ⅛ inch, wherein the two openings are spaced apart by a distance of from about 130 mils to about 250 mils.

19. The sensor of claim 17 wherein each of the two nozzles further comprises an internal passage for passing a pressurized gas, with the internal passage of the inlet nozzle being from about 70 to about 100 mils in diameter; and with the internal passage of the detector nozzle being from about 30 to about 50 mils in diameter.

* * * * *